United States Patent

Houk

[15] 3,645,108
[45] Feb. 29, 1972

[54] AIR DAMPER CONTROL FOR REFRIGERATORS

[72] Inventor: William J. Houk, Columbus, Ohio
[73] Assignee: Ranco Incorporated, Columbus, Ohio
[22] Filed: June 1, 1970
[21] Appl. No.: 41,851

[52] U.S. Cl. ................................................62/187, 236/49
[51] Int. Cl. ........................................................F25d 17/04
[58] Field of Search.........................................62/187; 236/49

[56] References Cited

UNITED STATES PATENTS

| | | | |
|---|---|---|---|
| 3,290,893 | 12/1966 | Haldopoulos | 62/187 |
| 3,050,961 | 8/1962 | Mann | 62/187 |
| 3,288,370 | 11/1966 | Mingrove | 62/187 |
| 3,447,747 | 6/1969 | McHale | 62/187 |

*Primary Examiner*—William J. Wye
*Attorney*—Watts, Hoffmann, Fisher & Heinke

[57] ABSTRACT

A refrigerator has a frozen food compartment maintained at subfreezing temperatures and a food-cooling compartment maintained at temperatures above freezing by circulation of chilled air through the compartments, the air being chilled by passing it over an evaporator operated at subfreezing temperatures in an air duct. A thermostatically actuated damper regulates the flow of chilled air into and through the food-cooling compartment according to the temperature in the cooling compartment. The damper comprises two face-to-face grilles each having a multiplicity of slots alignable with the slots of the other grille and one grille is shifted by a thermostatic element relative to the other to align more or less of the slotted areas. The thermostatic element is a vapor-filled bellows located in a housing in the chilling compartment and adjacent the air inlet. When the grilles are open air is aspirated from the compartment through the housing and in contact with the bellows and returned to the compartment with the chilled air.

4 Claims, 5 Drawing Figures

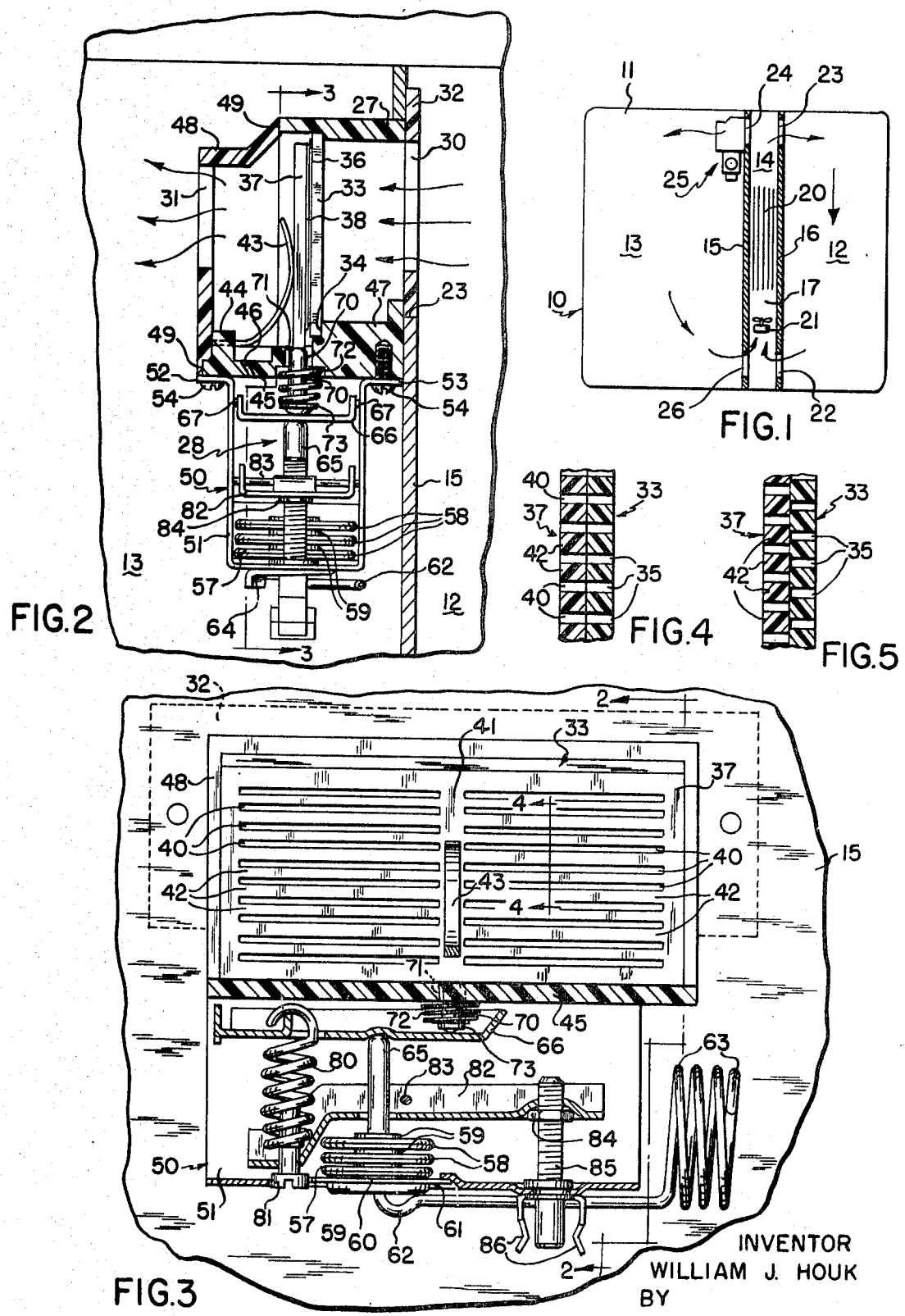

AIR DAMPER CONTROL FOR REFRIGERATORS

BACKGROUND OF THE INVENTION

In certain types of food storage refrigerators two compartments are provided in a single cabinet. One of the compartments is maintained at subfreezing temperatures for storage of frozen foods and the other compartment is maintained at above freezing temperatures for preserving fresh foods. The desired chilling of the compartments is effected by forcing air to circulate from the compartments and through a passageway having a refrigerator evaporator unit therein which chills the air to subfreezing temperatures in accordance with the cooling requirements of the freezing compartment. The chilled air is then directed into the freezing compartment. The temperature of the food-cooling compartment is maintained at above freezing temperatures by admitting more or less of the subfreezing temperature air from the passageway into the chamber through an air inlet controlled by a damper. Heretofore, the damper generally comprised a vane adapted to swing to and from the air inlet opening in accordance with expansion and contraction of a thermostatic element subjected to the temperature in the cooling compartment. The most satisfactory type of thermostatic element was a vapor-filled bellows having a capillary sensing tube attached thereto and containing a suitable temperature responsive vapor. The capillary tube was extended and coiled in an area of the cooling compartment representative of the average temperature in the compartment. Because the bellows was located adjacent the damper it was subjected to the subfreezing temperature of the chilled air entering the compartment. Consequently, the temperature of the bellows tended to be lower than that to which the capillary tube was subjected. As is well known, the vapor pressure in the bellows and its tube corresponds to the temperature at the coolest portion of the bellows and tube. Accordingly, to cause the bellows to respond to the temperatures sensed at the coiled tube portion it has been necessary to heat the bellows by an electrical heating element and maintain its temperature above the temperature of the sensing portion of the capillary tube. This expedient is relatively expensive not only because of the cost of incorporating the heating element in the control structure but also in the provision of electrical power connections for the heating element.

Another problem encountered with known refrigerators of the type mentioned is that the subfreezing temperature air entering the food storage compartment tends to freeze foods adjacent the air inlet.

THE PRESENT INVENTION

An important feature of the invention is the provision of means for causing the air entering the cooling compartment through a thermostatically operated damper to aspirate air from the compartment and through a housing for the thermostat so that the thermostat is subjected to air having a temperature representative of the average temperature in the cooling chamber. Thus, heating of a bellows type thermostat by an electric heater is obviated and more satisfactory temperature control is achieved. Furthermore, the aspirated compartment air mixes with the subfreezing temperature air and raises its temperature and reduces or deviates the tendency of fresh foods to freeze in the compartment.

Other objects and advantages of the present invention will become apparent from the following detailed description thereof made with reference to the accompanying drawings which form a part of the specification.

FIG. 1 is a schematic illustration of a refrigerator embodying the invention;

FIG. 2 is a sectional view of an air damper control for the refrigerator shown in FIG. 1, the section being taken along line 2—2 of FIG. 3;

FIG. 3 is a sectional view taken substantially along line 3—3 of FIG. 2; and

FIGS. 4 and 5 are fragmentary sectional views of two grilles taken substantially along line 4—4 of FIG. 3, on a larger scale, showing the grilles in two different relative positions.

Referring to FIG. 1, a refrigerator embodying the invention is shown at 10. The refrigerator 10 comprises a cabinet 11 having a frozen food storage compartment 12 and a food cooling compartment 13 for storage of fresh foods. The compartments 12 and 13 are separated by a vertical air passage or duct 14 formed by two spaced parallel vertical walls 15, 16, a rear wall 17 and a front wall, not shown. The construction of the refrigerator 10 is well known in the art and need not be shown in further detail for an understanding of the disclosure.

A refrigerator evaporator 20 forming an air chilling unit, is located in the duct 14 and has air-cooling fins between which air is forced by a blower 21 directing air upwardly through the duct. The blower 21 circulates air from the compartment 12 through the evaporator fins and back into the compartment 12. The air circulation path includes an opening 22 between the lower portion of the compartment 12 and the duct 14 and an opening 23 between the duct and the upper portion of the compartment. The path of circulation of the air is shown by arrows.

The evaporator 20 is a part of a conventional compressor-condenser-evaporator type refrigerating system and to avoid unnecessary description, the compressor and the controls therefor are not shown. Suffice to say, the refrigerating system is cycled by a temperature control responsive to the air temperature in the compartment 12 so as to maintain the air circulated therein from the evaporator 20 at a predetermined minimum temperature, such as 10° F.

The temperature of the air in food-cooling compartment 13 is controlled by admitting more or less of the air discharging from the evaporator 20 into the top of the compartment through an opening 24 between the duct 14 and the compartment. The flow of air into the compartment 13 through the opening 24 is controlled by a temperature-responsive damper mechanism 25. Air is returned to the duct 14 from the compartment 13 through an opening 26. As the temperature of the air in the compartment 13 tends to rise above a given desired temperature, such as 42° F., the damper mechanism 25 admits a greater volume of the chilled air into the compartment. As the temperature of the air inside the compartment 13 is reduced towards that desired the flow of air into the compartment is throttled by the mechanism 25.

The temperature-responsive damper mechanism 25 comprises a grille frame 27 and a thermostatic mechanism 28. The frame 27 is preferably formed of a suitable molded material and includes a hollow boxlike structure having a rectangular opening 30 in one side thereof and a rectangular outlet opening 31 in the opposite side. A flange 32 is formed about the inlet opening 30 and has openings by which the frame can be attached by suitable fasteners, not shown, to the air duct wall 15 and in the opening 24. The flange 32 surrounds the edges of the opening 24 and forms a seal so that air flow into the compartment 13 is effected only through the frame openings 30 and 31.

A panel-type grille 33 extends transversely of the opening 30. The edge portions of the grille 33 abut a shoulder 34 formed about the inner end edges of the opening 30 and are cemented to the shoulder by a suitable adhesive. The grille 33 has a multiplicity of relatively narrow longitudinally extending slots 35 formed therein. The slots 35 are regularly spaced and parallel to one another. The slots 35 are interrupted at the central portions thereof. Preferably, the grille 33 is formed of a plastic material of the type presenting a low coefficient of friction and its inner face is slightly embossed or raised in the slotted area, as seen at 36 in FIG. 2. The embossed face portion is flat and smooth.

A second grille 37 which is substantially identical in shape, material and form to the grille 33 is arranged with an embossed flat face 38 thereof slidingly engaging the embossed face 36 of the grille 33. The grille 37 has a multiplicity of slots 40 which correspond in spacing and width to the slots 35. The slots 40 are interrupted at their central portions so that the grille 37 has a solid panel portion 41 at its center. The material between the slots 40 form bars 42 and the width of the bars are greater than the width of the slots. The bars 42 serve to block the passage of air through the slots when the grille 40 is moved to its lowermost position. The confronting surfaces of the embossed portions of the grilles 33, 37 effectively seal the inner edges of the slots 35 when the bar portions 42 thereof close the slots.

The grille 37 is maintained in sliding engagement with the grille 33 by a strip bow spring 43. One end of the spring 43 is inserted into a slot in a block 44 formed on the lower wall 45 of the frame 27 and engages the portion 41 of the grille 37 and urges the latter to the grille 33.

When the grille 37 is in its lowermost position the bars 42 thereof register with the slots of the grille 37 and prevent air from passing through the frame 27 and into the cooling chamber 13. This condition is shown in FIG. 5. As the grille 37 is raised, the slots 40 thereof register with the slots 35 thereby permitting passage of air into the cooling chamber 13, as seen in FIG. 4. When the grille 37 has raised to a predetermined position the slots 40 thereof will be in exact registration with the slots 35, as seen in FIG. 4, and full flow of air into the chamber 13 is effected. It will be obvious that the stream of air flowing from the frame outlet 31 and into the compartment 13 will be considerably diffused by the multiplicity of the air slots 35, 40 and consequently turbulence adjacent the control mechanism 25 is minimized.

A narrow slot 46 is formed through the bottom wall 45 of the frame 27 and extends transversely of the frame. The walls of the slot 46 slope upwardly towards the outlet opening 31. When air flows from the inlet 30 to the outlet 31, a low-pressure area is created over the slot 46 and air is induced to flow upwardly through the slot.

To facilitate assembly, the frame 27 comprises two molded members 47, 48. The member 47 has the opening 30 formed therein and the other member 48 includes the opening 31. The member 47 has a rectangular lip or edge 49 to which a corresponding lip or edge on the member 48 is secured, such as by cement or fusion.

The thermostatic mechanism 28 is mounted in a sheet metal housing 50 which is attached to the lower wall 45 of the frame 27. The housing 50 comprises a channel-shape member 51 which has laterally extending flanges 52, 53 which are secured to the underwall of the frame 27 by screws 54. The housing 50 depends beneath the frame 27 and is disposed in the compartment 13. The lower wall 45 of the frame 27 forms the upper wall of the housing 51 and the lower opening of the slot 46 extends lengthwise of the interior of the housing.

A metal bellows 57 is supported on the bottom wall of the housing 50 and reciprocates the grille 40 vertically by expansion and contraction thereof. The bellows 57 contains a suitable vapor which expands and contracts in accordance with increases and decreases in temperature and tends to cause corresponding expansion and contraction of the bellows. The bellows 57 is comprised of three wafer shape capsules 58 arranged in stacked relation. Each capsule is formed of thin dish-shaped metal diaphragms hermetically joined about their peripheries. The central portions of the diaphragms have bosses 59 and the bosses of adjacent diaphragms are brazed to one another. The joined bosses 59 have registered openings so that the capsule interiors are interconnected. The lowermost capsule 58 is attached to a support plate 60 which is secured over an opening 61 in the bottom wall of the housing 50. One end of a capillary tube 62 is brazed in an opening through the plate 60 and the boss 59 of the lower wafer 58. The other end of the capillary tube is sealed and a portion of the sealed end of the tube is formed in a helix 63. The helix 63 is supported at one end of the housing 50 by a bracket 64. The bellows 57 and tube 62 contain a thermally responsive gas in vapor phase suitable for providing appreciable changes in vapor pressures in the temperature range to be controlled.

The boss 59 on the uppermost wall of the bellows has a post 65 attached thereto, the upper end of which engages in a dimple formed in the lower wall of the lever 66. When the bellows 57 expands, the post 65 is moved axially upwardly and moves the lever 66 to transmit motion of the bellows to the grille 37.

The lever 66 is comprised of a sheet metal stamping in the form of a channel and is pivoted at one end by lugs 67 formed on opposite sides thereof. The lugs extend into openings or notches in opposite sides of the housing 50. This mechanical expedient for pivoting the lever 66 is well known in the art, and the details are unnecessary to the understanding of the invention.

The grille 37 has a stem 70 attached to the central lower portion thereof, which stem projects downwardly through an opening 71 formed in the bottom wall 45 of the frame 27. The stem 70, and the grille 37, is urged downwardly by a compression spring 72 which surrounds the stem and has one end engaging in a recess in the wall 45 and the opposite end engaging a shoulder or washer 73 on the lower end of the stem. The stem 70 engages the lever 66 adjacent the free end of the lever so that vertical movements of the post 65 are imparted to the stem 70 and multiplied by the lever.

The lever 66 is loaded by a spring 80 for resisting expansive movement of the bellows 57. One end of the spring 80 is hooked to the lever 66, as shown, and the opposite end is threaded on a screw 81 which is rotatably supported in an adjusting lever 82. The lever 82 is formed by a channel-shape sheet metal member and the opposite sides thereof are pivoted on a pin 83. The ends of the pin 83 are supported in openings through the opposite sidewalls of the housing 50, as shown. The tension of the spring 80 tends to rotate the lever 82 clockwise, as viewed in FIG. 3, which movement is limited by a nut 84 threaded on an adjusting screw 85 and engaged by the lever. The adjusting screw 85 is rotatably positioned in the bottom wall of the housing 50 and the upper end extends through an opening through a dimpled portion of the lever 82. The screw 85 may be rotated by lugs 86 formed on a driving plate having a serrated opening which meshes with a serrated portion of the screw 85. An adjusting knob, not shown, may be fitted over the lugs 86 to facilitate rotation of the screw.

The tension of the spring 80 applies a load to the bellows 57 through the lever 66 and post 65. The tension of the spring 80 is such as to collapse the bellows 57 and move the lever 66 to its lowermost position when the temperature in the compartment 13 is at a desired minimum. The minimum temperature may be 42° F., for example. In this position, the slots 35 of the air grille 33 will be closed and no air will enter the compartment 13 through the frame 27. As the temperature of the air in the compartment 13 rises above 42° the bellows 57 commences to expand and move the lever 66 against the load of the spring 80 and raise the grille 37. The raising of the grille 37 gradually uncovers a greater area of the slots 35 so that flow of cold air into the chamber 13 is effected. When the temperature at the bellows 57 decreases, the bellows collapse and the grille 37 is lowered and throttles the flow of air into the compartment 13. Thus, the temperature of the compartment 13 is maintained at a substantially constant degree, according to the tension of the spring 80. The temperatures at which the grille 37 is actuated can be adjusted by varying the tension of the spring 80 by setting the screw 85. Calibration of the spring 80 is effected at the factory by adjusting the screw 81 to provide the proper setting of the spring tension for a given position of the screw 85.

As air flows through the frame 27 and into the chamber 13 through the opening 31 a low pressure exits above the slot 46 in wall 45 of the frame. The low pressure induces air to enter the housing 50 from the upper portion of the chamber 13 and flow through the slot 46. Air enters the housing through the open ends thereof and through gaps in the housing walls exiting at the ends of the channel 51, about the opening 61 and the openings for the screws 81, 85. The flow of air from the compartment 13 into the housing 50 causes both the capillary tube 63 and the bellows 57 to sense the same air temperature. The vapor pressure inside the bellows 57 will therefore correspond to the changes in temperature of the air from the compartment 13. The housing 50 shields the bellows from direct contact with the cold air entering the compartment through the frame outlet 31. By creating a flow of air from the compartment 13 through the housing 50 and directing diffused air into the compartment, the bellows 57 will not be affected by the cold airstream and require application of heat thereto. Furthermore, air drawn from the compartment upwardly through the slot 46 mixes with the air passing to the frame outlet 31 and tempers the below freezing temperature air and eliminates or reduces the tendency for fresh food to be frozen in the compartment 13.

I claim:

1. A refrigerator having a compartment to be cooled, an air chilling unit and means to force air into heat exchange relation with the chilling unit and through an air duct having an opening communicating with the interior of said compartment, air flow control means in said opening and comprising, a structure defining an air flow path, air damper means associated with said airflow path and including a movable member for controlling the flow of air through said airflow path, a thermally responsive power element in said compartment operable to actuate said movable member, wall means forming an air channeling housing about said power element and including an air inlet from said chamber, and means forming a venturi opening between said air path and the interior of said air channeling housing.

2. A refrigerator as defined in claim 1 further characterized by said wall means comprising a housing attached to said frame, and said power element comprising a bellows in said housing having a vapor fill, and a lever interconnecting said bellows and said damper.

3. A refrigerator as defined in claim 2 further characterized by said housing and said venturi opening comprising a slot extending across the top wall of said housing, and said housing being open at least at one end.

4. A refrigerator as defined in claim 3 further characterized by said housing comprising a channel-shape member having air inlet openings in opposite ends.

* * * * *